United States Patent [19]

Chautard et al.

[11] 4,237,952

[45] Dec. 9, 1980

[54] PNEUMATIC TIRE WITH SEALING LINING COMPRISING A THERMOSETTING RESIN AND ISOLATED RESIN CROSSLINKING AGENT

[75] Inventors: Jean Chautard, Mozac; André Chemizard, Clermont-Ferran, both of France

[73] Assignee: Compagnie Generale des Etablissements Michelin, Clermont-Ferrand, France

[21] Appl. No.: 57,439

[22] Filed: Jul. 13, 1979

[30] Foreign Application Priority Data

Jul. 13, 1978 [FR] France .................. 78 21344

[51] Int. Cl.³ .................. B60C 21/08; B60C 17/00
[52] U.S. Cl. .................. 152/330 RF; 152/330 L; 152/347; 156/115; 428/912; 106/33; 252/72
[58] Field of Search ........ 152/330 RF, 330 L, 330 C, 152/346–348, 330 R; 156/115; 428/912; 106/33; 252/72

[56] References Cited

U.S. PATENT DOCUMENTS

| 3,291,333 | 12/1966 | House | 428/912 X |
|---|---|---|---|
| 3,565,151 | 2/1971 | Courtney | 152/347 X |
| 3,920,061 | 11/1975 | Japp et al. | 152/347 X |
| 3,952,787 | 4/1976 | Okado et al. | 152/347 |
| 4,003,419 | 1/1977 | Verdier | 152/347 X |
| 4,037,636 | 7/1977 | Hagenbottmer et al. | 152/347 |
| 4,057,090 | 11/1977 | Hoshikawa et al. | 152/347 |
| 4,064,922 | 12/1977 | Farber et al. | 152/347 |
| 4,116,895 | 9/1978 | Kageyama et al. | 252/72 X |
| 4,149,579 | 4/1979 | Senger | 152/347 |

*Primary Examiner*—John T. Goolkasian
*Assistant Examiner*—Lois E. Rodgers
*Attorney, Agent, or Firm*—Brumbaugh, Graves, Donohue & Raymond

[57] ABSTRACT

A pneumatic tire whose inner wall is provided beneath the crown with a lining which extends at least from one shoulder to the other of the tread and comprises a layer of a sealing mixture capable of flowing into a puncture hole, the layer being covered radially inward by a vulcanized elastomeric partition, is improved due to the fact that the layer of sealing mixture has a base of at least one elastomer of low molecular weight, preferably less than 30,000, mixed with at least one thermosetting resin, and due to the fact that at least one cross-linking agent or hardener for the thermosetting resin is isolated from the layer of sealing mixture by means of a vulcanized elastomeric partition arraged radially inward of the layer of sealing mixture.

19 Claims, No Drawings

PNEUMATIC TIRE WITH SEALING LINING COMPRISING A THERMOSETTING RESIN AND ISOLATED RESIN CROSSLINKING AGENT

The present invention concerns a pneumatic tire whose inner wall is provided, at least in part, with a lining comprising a layer of a sealing mixture covered radially inward by a vulcanized elastomeric partition, the function of the lining being to plug a puncture hole in the tire as rapidly as possible by flow of the sealing mixture into the hole.

The applicants' studies and research have led to the development of a complex lining in which a layer containing a vulcanizable sealing mixture is adjacent a layer containing a vulcanizing mixture which is capable of vulcanizing the vulcanizable sealing mixture, the two layers being separated from each other by a vulcanized elastomeric partition. The materials forming the sealing and vulcanizing layers furthermore have viscosities such that the materials can flow into the puncture hole under the influence of the escape of air and seal the hole permanently. This avoids the necessity of removing the tire and turning it over to a repairman.

However, a system has also been developed which is formed of a simple lining comprising a layer of a vulcanizable sealing mixture and a dispersion of a component of the vulcanization system within the cavity of the tire, the component being capable also of being incorporated in a lubricant intended to avoid damage to the tire when it is traveling with a pressure less than the normal inflation pressure, or of being at least in part borne, in the form of a coating, by ultra-light granular particles intended to support the tire in case of a drop of pressure.

The purpose of the present invention is, in the event that there is used a sealing mixture having a base of an elastomer vulcanizable by the customary vulcanization means but capable of losing its effectiveness during the life of the tire, to replace the customary vulcanization means.

Thus, the present invention consists, in a pneumatic tire of the type described above, of using a layer of sealing mixture having a base of at least one elastomer of low molecular weight, preferably less than 30,000, mixed with at least one thermosetting resin, at least one cross-linking agent or hardener for the thermosetting resin being isolated from the layer of sealing mixture by means of a vulcanized elastomeric partition arranged radially inward of the layer of sealing mixture.

There is preferably employed a sealing mixture having an apparent viscosity of between $10^4$ and $10^7$ N/s/m$^2$ at 60° Celsius measured with a Weissenberg rheogoniometer at a shear velocity gradient of $10^{-2}$ to $10^{\circ}$s$^{-1}$. This apparent viscosity is preferably adjusted by means of a pulverulent or granular filler having a particle size less than 250 microns and/or of a fibrous filler formed of fibers having a length at least equal to 0.5 mm and a diameter between 0.005 and 0.040 mm.

The thermosetting epoxy resins derived from the diglycidyl ether of bisphenol A (for example, EPON 828 of Shell) have been found to be well-suited due to their reaction velocity, the hardeners being preferably selected from among amines, such as diaminodiphenylmethane and diethylene triamine, in combination with lactones, for instance Hyg77 of CIBA (diaminodiphenylmethane and γ-butyrolactone).

The use of liquid catalysts, such as the hemiesters or aminophenols, makes it possible to accelerate the cross-linking.

Among the thermosetting resins cross-linkable at low temperature there may be employed polyurethanes and polyesters. Polyurethanes of the type in accordance with the invention are obtained by mixing a saturated dihydroxy oligomer, a cross-linking agent, a catalyst, and a diisocyanate, these components being contained in a polyisobutylene elastomer matrix.

For preparing the polyurethanes there are particularly suited saturated dihydroxy polyethers (polytetrahydrofuran, ethylene polyoxide, and propylene polyoxide), saturated dihydroxy polyesters (polyadipates, polyazelates, and polysuccinates of ethylene glycol, propylene glycol, butanediol-1,4 and hexanediol-1,6), and their mixtures. The cross-linking agent is preferably a triol, in particular glycerol or trimethylol propane. As catalyst one can use diazobicyclooctane, a metallic triacetylacetonate, tin octoate, or mercury salts. Among the diisocyanates, 4,4'-diisocyanato-diphenylmethane (MDI) and isophorone diisocyanate which are of low volatility are well-suited.

With respect to the polyesters, the derivatives of methacrylic acid give satisfactory results in combination with peroxides.

EXAMPLE 1

The inner self-sealing lining is a complex lining with two layers separated by a vulcanized rubber partition.

The composition of the layer of cross-linkable sealing mixture is as follows (% by weight):

| | |
|---|---|
| elastomer of low molecular weight: polyisobutylene | 41.6 |
| filler: vulcanized rubber powder | 40.3 |
| thermosetting resin: Epon 828 Shell (epoxy resin derived from the diglycidyl ether of bisphenol A) | 18.1 |

The composition of the layer of cross-linking mixture is as follows (% by weight):

| | |
|---|---|
| polyisobutylene | 37.8 |
| filler: vulcanized rubber powder | 44.9 |
| hardener: HY 977 Ciba (diaminodiphenylmethane) | 16.5 |
| catalyst: DY 060 Ciba (hemi-ester derived from maleic acid) | 0.8 |

EXAMPLE 2

The inner self-sealing lining is a simple lining and comprises a layer of cross-linkable sealing mixture. This sealing mixture contains (% by weight):

| | |
|---|---|
| elastomer of low molecular weight: polyisobutylenes | 42.4 |
| filler: carbon black MT/NS | 55.6 |
| thermosetting resin: Epon 828 Shell (epoxy resin derived from the diglycidyl ether of bisphenol A) | 2.0 |

The hardner is diethylene triamine incorporated in a lubricant in an amount of 7.5% by weight, the lubricant having, for example, the following composition (% by weight):

| | |
|---|---|
| silicone emulsion | 65 |
| synthetic oil having a base of polyglycol ethers | 5 |
| ethanol | 30 |
| quanternary ammonium(alkyl-dimethylbenzyle ammonium chloride) | 300 ppm |
| diethylenetriamine | 7.5 |

In accordance with the invention, this lubricant may be used either in sprayed or liquid state within the cavity of the tire or as a coating on granular particles of ultra-light cellular material, such as those described in U.S. Pat. No. 4,003,419, or on ultra-light gas-filled microspheres, such as those described in U.S. Pat. No. 4,037,636, the disclosures of these patents being incorporated by reference herein.

The following Example 3 illustrates the use of an in situ formed polyurethane as the thermosetting resin.

| | % by Weight |
|---|---|
| Cross-Linkable Sealing Mixture: | |
| polyisobutylene rubber (molecular weight 15,000) | 72.54 |
| polyisobutylene rubber (molecular weight 2,000) | 18.14 |
| polyadipate of ethylene glycol and propylene glycol (molecular weight 2,800) | 9.10 |
| glycerol | 0.18 |
| diazobicylooctane | 0.04 |
| Cross-Linking Mixture: | |
| polyisobutylene rubber (molecular weight 15,000) | 67.8 |
| polyisobutylene rubber (molecular weight 2,000) | 16.9 |
| 4,4'-diisocyanato-diphenylmethane | 15.3 |

After puncture, tires equipped with self-sealing layers in accordance with the present invention do not exhibit any substantial loss in pressure even after several months of daily use.

What is claimed is:

1. A pneumatic tire whose inner wall is provided, at least in part, with a lining comprising a layer of a sealing mixture capable of flowing into a puncture hole, the layer being covered radially inward by a vulcanized elastomeric partition, characterized by the fact that the layer of sealing mixture has a base of at least one elastomer of low molecular weight less than 30,000, mixed with at least one thermosetting resin, and by the fact that at least one cross-linking agent or hardener for the thermosetting resin is isolated from the layer of sealing mixture by means of the vulcanized elastomeric partition arranged radially inward of the layer of sealing mixture.

2. The tire according to claim 1, characterized by the fact that the sealing mixture has an apparent viscosity of between $10^4$ and $10^7$ N/s/m$^2$ at 60° Celsius measured with a Weissenberg rheogoniometer at a shear velocity gradient of $10^{-2}$ to $10°s^{-1}$.

3. The tire according to claim 2, characterized by the fact that the apparent viscosity of the sealing mixture is adjusted by means of a pulverulent or granular filler having a particle size less than 250 microns.

4. The tire according to claim 1, characterized by the fact that the thermosetting resin is an epoxy resin derived from the diglycidyl ether of bisphenol A and the hardener is selected from among amines in combination with γ-butyrolactone.

5. The tire according to claim 1, characterized by the fact that the thermosetting resin is a polyurethane obtained, as known per se, by mixing a saturated dihydroxy oligomer, a cross-linking agent, a catalyst, and a diisocyanate, these components being contained in a polyisobutylene elastomer matrix.

6. The tire according to claim 1, characterized by the fact that the cross-linking agent or hardener is associated with a liquid catalyst for the thermosetting resin.

7. The tire according to claim 6, characterized by the fact that the liquid catalyst is selected from among the hemi-esters and aminophenols.

8. The tire according to claim 1, characterized by the fact that the cross-linking agent or hardener is contained in a cross-linking layer adjacent to the layer of sealing mixture, the cross-linking layer being separated from the layer of sealing mixture by the vulcanized elastomeric partition.

9. The tire according to claim 1, characterized by the fact that the cross-linking agent or hardener is dispersed in the cavity of the tire by spraying.

10. The tire according to claim 2, characterized by the fact that the apparent viscosity of the sealing mixture is adjusted by means of a fibrous filler formed of fibers having a length at least equal to 0.5 mm and a diameter between 0.005 and 0.040 mm.

11. The tire according to claim 2, characterized by the fact that the apparent viscosity of the sealing mixture is adjusted by means of a pulverulent or granular filler having a particle size less than 250 microns and of a fibrous filler formed of fibers having a length at least equal to 0.5 mm and a diameter between 0.005 and 0.040 mm.

12. The tire according to claim 1, characterized by the fact that the cross-linking agent or hardener and a liquid catalyst for the thermosetting resin are contained in a cross-linking layer adjacent to the layer of sealing mixture, the cross-linking layer being separated from the layer of sealing mixture by the vulcanized elastomeric partition.

13. The tire according to claim 1, characterized by the fact that the cross-linking agent or hardener is dispersed in the cavity of the tire by incorporation in a lubricant.

14. The tire according to claim 1, characterized by the fact that the cross-linking agent or hardener is dispersed in the cavity of the tire by incorporation in the form of a coating on ultra-light granular particles.

15. The tire according to claim 1, characterized by the fact that the cross-linking agent or hardener is dispersed in the cavity of the tire by incorporation in the form of a coating on ultra-light spheres.

16. The tire according to claim 1, characterized by the fact that the cross-linking agent or hardener and a liquid catalyst for the thermosetting resin are dispersed in the cavity of the tire by spraying.

17. The tire according to claim 1, characterized by the fact that the cross-linking agent or hardener and a liquid catalyst for the thermosetting resin are dispersed in the cavity of the tire by incorporation in a lubricant.

18. The tire according to claim 1, characterized by the fact that the cross-linking agent or hardener and a liquid catalyst for the thermosetting resin are dispersed in the cavity of the tire by incorporation in the form of a coating on ultra-light granular particles.

19. The tire according to claim 1, characterized by the fact that the cross-linking agent or hardener and a liquid catalyst for the thermosetting resin are dispersed in the cavity of the tire by incorporation in the form of a coating on ultra-light spheres.

* * * * *